United States Patent Office 3,172,902
Patented Mar. 9, 1965

3,172,902
PHOSPHONOTHIOIC ESTERS CONTAINING A DIMESYLIMIDO GROUP
Karoly Szabo, Pleasantville, N.Y., and John G. Brady, Campbell, Calif., assignors to Stauffer Chemical Company, New York, N.Y., a corporation of Delaware
No Drawing. Filed Feb. 12, 1963, Ser. No. 257,887
6 Claims. (Cl. 260—461)

This invention pertains to organophosphorus toxicants and in particular to organophosphorus esters wherein one of the esterifying moieties is characterized by the presence of a dimesylimido function. The invention likewise relates to the preparation of the aforenamed compounds as well as their use in pesticidal compositions.

In accordance with the present invention, it has been discovered that the incorporation of a dimesylimido residue in an organophosphorus structure engenders a new class of organophosphorus toxicants which have proven to possess high biocidal activity. We have, for instance, synthesized numerous and varied organic thiophosphonates wherein the dimesylimido group is attached at one of the ester sites. The resulting dimesylimido phosphonates are effective in combating insects, mites, nematodes and similar pest organisms categorized within the lower orders of biological classification.

The new and novel organophosphorus esters of the invention can be depicted by the following chemical formula:

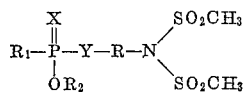

wherein $R_1$ and $R_2$, which may be alike or different, refer to lower alkyl radicals and their chlorinated derivatives; X and Y are chalcogens as represented by oxygen (O) or sulfur (S) and R is a lower alkylene bridge.

Compounds included within the metes and bounds of the aforedescribed formula are structurally set forth below:

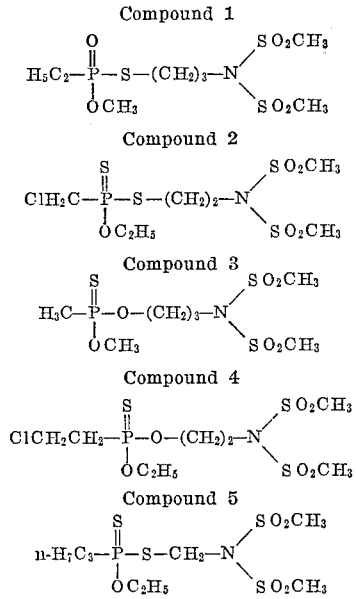

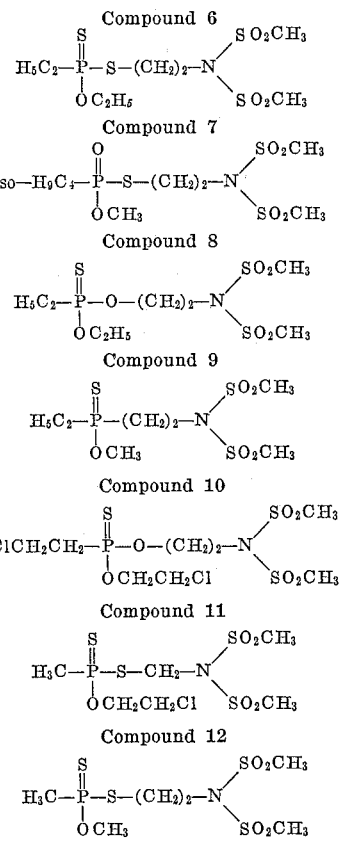

The dimesylimido phosphonates and thiophosphonates of the invention can in some instances be realized by utilizing chemical intermediates known to the orgnophosphorus art. This is particularly so with respect to those compounds wherein the alkylene chain is a methylene chain. Such derivatives are commonly produced by reacting a S-chloromethyl phosphonate with an alkali metal salt of dimesylimide. The reaction is conveniently carried out by refluxing approximately equal molecular quantities of the reactants in the presence of an organic solvent. If, however, one is desirous of obtaining higher alkylene derivatives, the reaction is preferentially effected by condensing a phosphonochloridate or a phosphonate salt with an N-alkyldimesylimide, the alkyl substituent of which is provided with a terminal hydroxy or halogen group. These latter intermediate compounds, which are new and novel derivatives in themselves, can be obtained by reacting in approximately equal molar proportions the alkali metal salt of dimesylimide with a dihaloalkane or a monohalo saturated aliphatic alcohol. Typically, one mole of the sodium salt of dimesylimide is reacted with a slight excess of 1-bromo-2-chloroethane in the presence of boiling ethylene glycol monomethyl ether. The resulting N,2-chloroethyl dimesylimide is isolated from the reaction mixture and the product purified by crystallization. By carrying out the reaction using ethylene chlorohydrin in lieu of the 1-bromo-2-chloroethane there is obtained a comparable yield of N,2-hydroxyethyl dimesylimide.

The aforedescribed new and novel alkyl dimesylimides bearing terminal hydroxy and chloro substituents are described in co-pending application, Serial No. 277,489, filed May 2, 1963, in the name of Karoly Szabo and assigned to the Stauffer Chemical Company.

Reference is now made to the following examples which are presented for the purpose of illustration only since variations and modifications in practicing the invention without departing from the spirit or scope thereof will be apparent to those skilled in the art to which the said invention pertains.

EXAMPLE 1

2-(O-ethyl ethylphosphonodithioyl)ethyldimesylimide

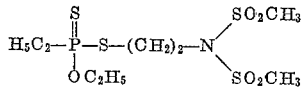

11.8 g. (0.05 M) of N,2-chloroethyldimesylimide and 8.5 g. (0.05 M) of O-ethyl ethylphosphonodithioic acid are added to a solution obtained by adding 1.13 g. of sodium to 80 ml. of absolute alcohol. After refluxing for 7 hours, the precipitated sodium chloride was removed by filtration and the filtrate subjected to distillation under reduced pressure to remove all volatile components. The residual yellow, viscous oil amounted to 11.0 g. and had a refractive index of 1.5292 at 24° C. The analytical data is in consonance with the above depicted structure. The product was found to be exceptionally active against mites, insects and nematodes. The pure compound may be obtained by recrystallization from methanol. M.P. 70° C.

EXAMPLE 2

2-(O-ethyl ethylphosphonothionyl)ethyldimesylimide

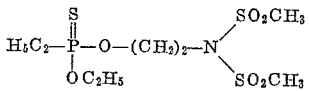

A mixture of 21.7 g. (0.1 M) of N-β-hydroxyethyl dimesylimide, 17.2 g. (0.1 M) of O-ethyl ethylphosphonochloridothioate and 10.4 g. of triethylamine and 100 ml. of toluene were refluxed for six hours. A precipitate of triethylamine hydrochloride began forming after about one hour of heating. Following the period of refluxing, the mixture was cooled to room temperature and a heavy oil had settled out at the bottom of the reaction vessel. The oil was removed by extracting it with 60 ml. of methylethylketone. The hydrochloride salt was separated by filtration. The solvent extract was washed with 25 ml. of water followed by drying over anhydrous magnesium sulfate. After removing all volatile materials and solvent under reduced pressure, there was obtained 24 g. of a residual, light brown oil having a refractive index of 1.5155 at 23° C. The product analysis was shown to conform to the above depicted structure. The product was effective at a concentration of 110 p.p.m. against nematodes.

EXAMPLE 3

2-(O-methyl ethylphosphonodithioyl)ethyldimesylimide

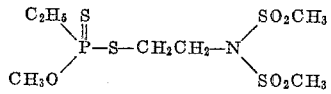

The procedure as generally outlined in Example 1 was again carried out using O-methyl ethylphosphonodithioic acid in lieu of the O-ethyl ester. The product was a light yellow, slightly viscous oil having an $N_D^{25}$ of 1.5335.

EXAMPLE 4

2-(O-methyl methylphosphonodithioyl)ethyl dimesylimide

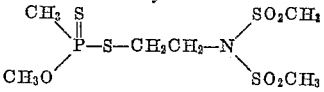

This preparation was carried out in accordance with the previously described procedure but using O-methyl methylphosphonodithioic acid. The product was obtained in the form of an essentially colorless, slightly viscous oil having a refractive index of 1.5402 at $N_D^{25}$.

EXAMPLE 5

(O-isopropyl ethylphosphonothioyl)methyldimesylimide

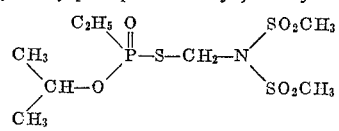

This compound was prepared by refluxing for a period of 48 hours a mixture of 16.8 g. (0.1 M) of S-chloromethyl-O-isopropyl ethylphosphonodithioic acid, 17.3 g. of dimesylimide and sodium butoxide obtained by reacting 2.3 g. (0.1 M) of metallic sodium in 80 ml. of butanol. After the reaction had cooled to room temperature, the solids were removed by filtration and the organic portion subjected to distillation under reduced pressure to remove volatile components. There was obtained a residual, light yellow, slightly viscous oily product in a yield of 22.0 g.

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media. For instance, it may be convenient to dissolve the toxicant directly in a solvent such as kerosene, fuel oil, xylene, alkylated naphthalenes or the like and use such organic solutions directly. However, it is more common procedure to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, polyoxyethylene, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular need.

Other adjuncts may be resorted to in compounding biocidal formulations based on the herein described dimesylimido organophosphorus esters and in this connection reference is made to adhesives, spreaders, activators, fertilizers, and the like. It is, moreover, to be understood that the toxicants of the invention may be applied directly to the adult pest organisms or its various metamorphic stages including the eggs. In any event, the end result is to eradicate or control the pest organisms.

We claim:

1. An organophosphorus ester of the formula:

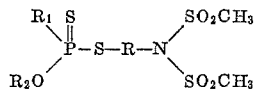

wherein $R_1$ and $R_2$ are selected from the class consisting of alkyl and chloroalkyl and R represents lower alkylene.

2. An organophosphorus ester of the formula:

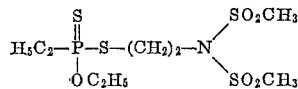

3. An organophosphorus ester of the formula:
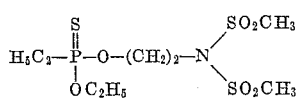
4. An organophosphorus ester of the formula:
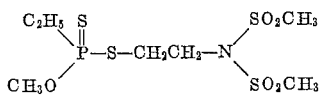
5. An organophosphorus ester of the formula:
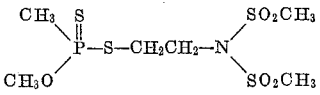
6. An organophosphorus ester of the formula:
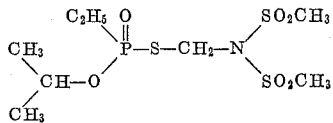
No references cited.